United States Patent [19]

Phillips

[11] Patent Number: 4,920,837

[45] Date of Patent: May 1, 1990

[54] TOOL

[75] Inventor: John A. Phillips, Balsham, United Kingdom

[73] Assignee: Dom Holdings PLC, United Kingdom

[21] Appl. No.: 255,499

[22] Filed: Oct. 11, 1988

Related U.S. Application Data

[63] Continuation of Ser. No. 39,758, Apr. 16, 1987, abandoned, which is a continuation of Ser. No. 804,868, Dec. 5, 1985, abandoned.

[30] Foreign Application Priority Data

Dec. 7, 1984 [GB] United Kingdom ............... 8431027

[51] Int. Cl.$^5$ .............................................. B25B 19/00
[52] U.S. Cl. ....................................... 81/463; 81/466; 173/128; 408/226
[58] Field of Search ................. 81/463, 466, 436, 438, 81/177.1, 177.5; 408/226, 231, 146, 704; 173/128, 104, 109

[56] References Cited

U.S. PATENT DOCUMENTS

| | | | |
|---|---|---|---|
| 2,047,125 | 7/1936 | Gartin | 173/104 |
| 2,677,562 | 5/1954 | Coffman et al. | 81/463 |
| 3,289,290 | 12/1966 | Sander | 81/436 |
| 3,637,225 | 1/1972 | Schmuck | 408/266 |
| 4,232,985 | 11/1980 | Nielson | 408/266 |

Primary Examiner—Frederick R. Schmidt
Assistant Examiner—Maurina Rachuba
Attorney, Agent, or Firm—Shapiro and Shapiro

[57] ABSTRACT

A tool such as a drill bit which has a generally cylindrical shank for insertion in a tool receiver or holder of a rotary percussive machine or other rotary machine, such as a drilling machine. The shank has a curved surface portion and a flat surface portion of rectangular configuration, the flat surface portion lying between the ends of the shank. When the shank is inserted in a tool receiver of a rotary percussive machine (not shown), driving elements thereof engage and act on the flat surface to provide driving torque to the tool, which is thereby rotated.

1 Claim, 1 Drawing Sheet ns/index# TOOL

This is a continuation of application Ser. No. 039,758 filed Apr. 16, 1987, now abandoned, which is a continuation of application Ser. No. 804,868 filed Dec. 5, 1985, now abandoned.

The invention relates to a tool, particularly a tool for insertion in the tool receiver of a rotary percussive machine or other rotary machine, such as a drilling machine.

According to one aspect of the invention there is provided a tool for insertion in the tool receiver of a rotary percussive or rotary machine, comprising a shank having a boundary surface including a curved portion and a flat portion, the arrangement being such that the flat portion is arranged to be drivingly engaged by driving means of the tool receiver in use.

There may be two flat portions which may be substantially parallel and on opposite sides of the longitudinal axis of the shank.

The flat portion or portions may extend over a part of the shank between the two ends thereof.

Alternatively, the flat portion or portions may extend from the free end of the shank to a position intermediate the length thereof.

According to a second aspect of the invention there is provided apparatus comprising a tool as hereinbefore defined and a rotary percussive or rotary machine, the tool being received by the tool receiver thereof with driving means of the tool receiver in driving engagement with the flat portion or portions for transferring rotary drive from the machine to the tool.

Tools embodying the invention are hereinafter described, by way of example, with reference to the accompanying drawings.

Figure 1:
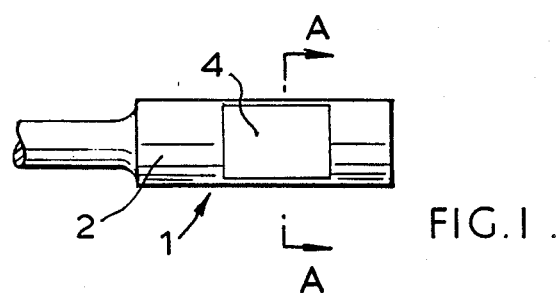
FIG. 1 is a side elevation of the tool according to the invention.
Figure 2:
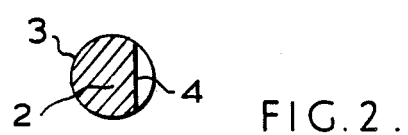
FIG. 2 is a transverse sectional view on line A—A of FIG. 1.
Figure 3:
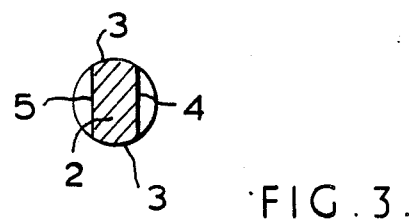
FIG. 3 is a transverse sectional view through a shank of an alternative embodiment of tool according to the invention.

Referring to the drawings, in which corresponding parts are referred to by the same reference numerals, the tool 1 shown is a drill bit which has a generally cylindrical shank 2 for insertion in a tool receiver or holder of a rotary percussive machine or rotary machine, such as a drilling machine (not shown). As will be seen in FIG. 1, the drill bit 1 further includes a working portion 2' (shown fragmentarily) integral with shank 2 and extending axially therefrom. The shank 2 has a curved surface portion 3 and a flat surface portion 4 of rectangular configuration, the flat surface portion 4 lying between the ends of the shank (FIG. 1). flat portions. More particularly, as will be seen in FIG. 3, the shank 2 in this alternative embodiment has a cylindrical boundary with two parallel chordal flats 4 and 5 on opposite sides of the shank in planes parallel to the bit axis.

When the shank 2 is inserted in a tool receiver of a rotary percussive machine (not shown), driving elements thereof engage and act on the or each flat surface 4 and/or 5 to provide driving torque to the tool, which is thereby rotated.

This construction provides in both embodiments a relatively simple yet efficient arrangement which does not require precision grinding or milling of splines, grooves etc. and allows a direct driving contact between the tool and driving elements of the tool receiver on insertion of the tool in the receiver.

The shank 2 may include grooves (not shown) for receiving retaining elements of the receiver.

I claim:

1. A drill bit for insertion in the tool receiver of a rotary percussive machine, said drill bit having a shank portion and a working portion extending axially from said shank portion, wherein said shank portion has a boundary which is cylindrical with the exception of two opposed parallel chordal flats lying entirely in planes parallel to the axis of the bit at opposite sides of said shank portion for receiving a rotational driving force by engagement with driving means of the tool receiver in order to effect rotation of the drill bit in use, said flats lying intermediate opposite axial ends of said shank portion.

* * * * *